Patented Sept. 19, 1922.

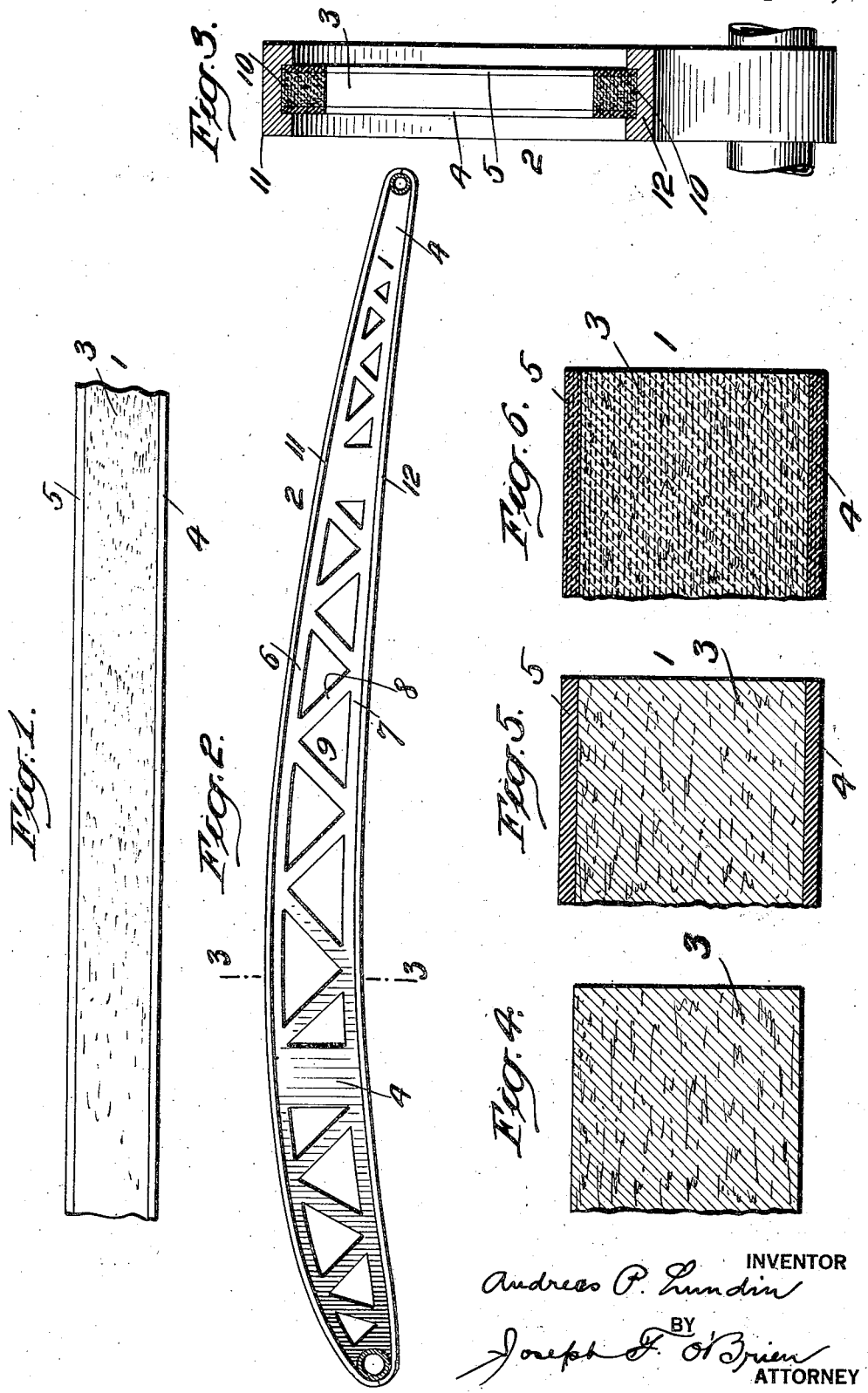

1,429,600

UNITED STATES PATENT OFFICE.

ANDREAS P. LUNDIN, OF FLUSHING, NEW YORK, ASSIGNOR TO AMERICAN BALSA COMPANY, INC., A CORPORATION OF NEW YORK.

BEAM STRUCTURE.

Original application filed November 21, 1918, Serial No. 263,464. Divided and this application filed December 7, 1920. Serial No. 429,043.

*To all whom it may concern:*

Be it known that I, ANDREAS P. LUNDIN, a citizen of the United States, and a resident of Flushing, borough of Queens, county of Queens, and State of New York, have invented certain new and useful Improvements in Beam Structures, of which the following is a specification.

This invention relates to improvements in beam structures, and is especially adapted for use in aerofoil frames and like aircraft structures and is a division of the subject-matter included in my application, Serial No. 263,464, filed November 21st, 1918.
In aerofoil frames and like aircraft construction it is, of course, desirable to make the ribs of a material which will be as light as possible consistent with the required strength and durability. My investigations have resulted in the discovery that balsa wood (*Ochroma lagopus*) is not only incomparably the lightest material procurable but also possesses comparatively great strength, and furthermore possesses the additional characteristics of sound and heat insulation. This material, however, is porous, soft, pithy and easily fracturable and does not itself possess the necessary qualities to enable aerofoil ribs to be manufactured of this wood alone. I have found, however, when a body or trunk portion of this material is faced or flanked with layers or plates of a hard and tenacious material, such as compressed or indurated fibre or composition which is securely fastened to the trunk over its entire surface, so as, in effect, to make said trunk and layer or layers of tough material a single integral structural body, a composite material is produced which possesses in a high degree the qualities sought in structural materials for aircraft manufacture and is very desirable for use in aerofoil ribs and like aircraft frame-construction. Such composite material will have ample strength, suitable flexibility and will be of much less weight in proportion to strength than is inherent in the wooden ribs and like aircraft frame parts now employed in airplane construction. In fact, I find that a rib so produced has greater advantages of structure and strength than is inherent in a beam of similar dimensions wholly composed of indurated fibre or heavier material though possessing much less weight. I also find that the tenacity and elasticity of a rib or like element made of such composite material are respectively very much greater than the sums of the tenacities and elasticities of the component parts or materials and also greater than the tenacities and elasticities of ribs of simila dimensions composed of the heavier material while it is, of course, very much lighter in weight.

Such material is, in effect, an I-beam and from an engineering standpoint must be figured in the same manner as such beams and the outer tough layers of fibre will act similarly to the flanges of an I-beam while the balsa wood trunk or body will act similarly to the web of such a beam; that is to say, the strength of the complete structure is caused to be transferred toward the said outer tough layers or flanges and the body or web of balsa wood, not only forms the major part of the composite material so as to afford extreme lightness in weight, but also transmits stresses toward the outer portions of the said material, and as aforesaid it combines in one integral structure the desirable characteristics of great structural strength, extreme lightness and weight, resistance to strains of compression, crushing, shearing and torsion, as well as surface hardness. Furthermore any local strain applied at the hard surface or surfaces will be caused to be distributed over a considerable area adjacent to the place of application of the stress or pressure causing such local strain.

In my preferred form of aerofoil ribs and spars the web of the rib is composed of this composite material of my invention, and said web preferably has struts and interstruts openings of suitable dimensions cut therein to further eliminate weight. I also prefer to make the top and bottom longitudinally-extending portions of such rib of a suitable tough material or wood such as fibre or spruce.

Balsa wood and similar light woods readily absorb water and therefore such woods employed by me in aircraft construction are treated by the use of paraffin to preserve and make the same waterproof.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of a piece of material suitable for use in aircraft construction as the web of a rib for aerofoil frames;

Fig. 2 is a side elevation of a rib embodying my invention;

Fig. 3 is a section on the line 3—3 of Fig. 2;

Fig. 4 is an enlarged detail edge view of a fragment of balsa wood board before the layers or flanking plates are applied;

Fig. 5 is a similar view with the side layers applied; and

Fig. 6 is another similar view illustrating the composite board impregnated with paraffin to waterproof and preserve the same.

Referring now to these drawings, 1 (Fig. 1) indicates a composite board or beam suitable for use when properly shaped as the web portion of a rib 2, (Figs. 2 and 3) suitable for use in aerofoil frames. In these figures, the web portion 1 of the rib 2 comprises, as aforesaid, a composite board embodying a body or trunk 3 of balsa wood or the like, on the opposite surfaces of which are mounted layers, skins or flanking plates 4 and 5 of tough fiber such as compressed or indurated fiber, such layers being preferably glued securely to the outer surfaces of the said balsa wood body before the web is cut as hereinafter stated. Part of the said web is preferably cut away to further eliminate weight and to provide upper and lower rim strips 6 and 7; struts 8 merging with such rim strips and interstrut openings 9. In the construction of the web the trunk is preferably of a width similar to that of the layers 4 and 5, as illustrated in Figs. 2 and 3.

Also as illustrated in said Fig. 3, the web 2 is, as shown, preferably fitted into notches 10 in top and bottom flanges 13 and 14, and the top and bottom edges of the web are preferably securely glued to the said flanges which are preferably composed of hard wood, fiber or other suitable material. I thus produce a rib of extreme lightness and great strength.

The said web 1 is as aforesaid formed of an inner body or trunk and outer layers, skins or flanking plates at opposite sides thereof, and as illustrated more particularly in Figs. 4, 5 and 6, the said trunk provides the main or basic structural element of the web. Because this body or trunk is composed of balsa wood or similar extremely light, soft, porous or easily fracturable wood, such as ceiba, it possesses the desirable characteristics of lightness in weight, sound insulation and heat insulation and has as a whole a maximum of structural strength relative to its weight and also has relatively great resistance to strains of compression and torsion but it is, as aforesaid, relatively soft, porous and pithy in structure and offers but little resistance to local fracture or depression. When the outer surface layers, skins or flanking plates 5 and 6 which are composed of a hard and tenacious material, preferably of tough indurated fiber, are securely fastened to the said trunk over its entire surface, the said layers and trunk become in effect one integral structural body. This fastening of the layers to the trunk is preferably accomplished by gluing the surface layers or flanking plates 5 and 6 to the trunk 4.

As balsa wood and similar light woods readily absorb water such woods employed by me in aircraft construction are treated by the use of paraffin to preserve and make the same waterproof, and, if desired, a balsa wood core or trunk may be first treated and the outer layers or flanking plates subsequently applied or the said outer layers or plates may be first applied and the complete element then treated as indicated in Figs. 4, 5 and 6, in which the dark and close broken lines are intended to indicate impregnated wood.

By the use of a web of this character, I am enabled to produce a beam structure which may be used as an aerofoil rib which as a whole or complete structure will combine great strength and resistance to strains of compression or torsion and also by reason of the hardness and resistance to fracture, crushing and shearing of its surface or surfaces, any local strains applied on such hard surfaces will be caused to be distributed over a considerable area adjacent to the point of application of the stress causing the local strain.

The tenacity and elasticity of such a web are respectively very much greater than the sums of the tenacities and elasticities of the component parts of materials and also greater than the tenacities and elasticities of a beam of similar dimensions composed of the heavier material while it is of course very much lighter in weight. Said structure is in effect an I-beam and must be figured in the same manner as an I-beam. In other words tough fiber layers will act, similarly to the flanges of an I-beam and the balsa wood trunk will act similarly to the web of an I-beam, that is to say, the strength of the structure is caused to be transferred toward the tough outer layers or flanges and the trunk or body of balsa wood therefore not only forms a major part of the composite structure, thus lending its characteristic of lightness thereto, but also transmits stresses toward the said outer portions.

The use of my composite boards, therefore, in the construction of an airplane rib or like aircraft frame part, results in the production of a frame part or rib which will not only be of less weight per unit of measurement than similar beams of wood now employed in aerofoil frames but will have the desirable characteristics above described.

Having described my invention I claim:—

1. An airplane frame, the structure of which consists in part of balsa wood, suitably treated with paraffin to preserve it and make it waterproof and flanked by plates of relatively tough material.

2. An airplane frame, the structure of which consists in part of balsa wood flanked by plates of relatively tough material.

3. An airplane frame, the structure of which consists in part of balsa wood flanked by plates of tough fiber.

4. An aerofoil rib whose web consists of a board composed of balsa wood flanked by plates of relatively tougher material.

5. An aerofoil rib whose web consists of a board composed of balsa wood flanked by plates of tough fiber.

6. A rib for aerofoil frames embodying hardwood top and bottom flanges and a web comprising a composite beam composed of a central trunk of balsa wood and relatively thin outer layers of a hard and tenacious material on opposite sides of and securely fastened to said trunk, said web being cut out to provide rim strips, struts merging with said rim strips and inter-strut openings therebetween.

7. A beam structure composed of oppositely disposed layers of a suitable tough material possessing surface hardness and an intermediate trunk of balsa wood suitably treated with a preservative material, said trunk and outer layers being securely fastened together to form a substantially integral structure.

8. A beam structure composed of a trunk of wood having substantially the qualities of balsa wood, and a surface layer of hard and tenacious material securely fastened thereto, whereby a composite beam is produced in which any local strain applied at the said surface layer will be distributed on the beam as a whole over a considerable area from the point of application of the stress causing such strain, and the complete structure will possess the desirable characteristics of elasticity and lightness in weight combined with tenacity, structural strength and hardness of surface.

In witness whereof, I have signed my name to the foregoing specification in the presence of two subscribing witnesses.

ANDREAS P. LUNDIN.

Witnesses:
HELEN V. WHIDDEN,
STALLO VINTON.